United States Patent [19]
Nier et al.

[11] 4,063,237
[45] Dec. 13, 1977

[54] DISTANCE MEASURING SYSTEM, PARTICULARLY FOR SPACING OF MOVING VEHICLES

[75] Inventors: Johannes Nier, Gerlingen; Heins Bollhagen, Stuttgart; Berthold Wocher, Leonberg, all of Germany

[73] Assignee: Robert Bosch GmbH, Stuttgart, Germany

[21] Appl. No.: 540,330

[22] Filed: Jan. 13, 1975

[30] Foreign Application Priority Data

Feb. 21, 1974 Germany .............................. 2408333

[51] Int. Cl.$^2$ ..................... B60K 26/04; B60T 7/12; G01S 9/39; G08G 1/16
[52] U.S. Cl. .................. 343/7 VM; 180/98; 340/34; 343/6.5 SS
[58] Field of Search ...................... 343/6.5 SS, 7 VM; 340/34; 180/98

[56] References Cited

U.S. PATENT DOCUMENTS

| | | | |
|---|---|---|---|
| 2,702,342 | 2/1955 | Korman | 343/6.5 SS |
| 2,996,137 | 8/1961 | Chu et al. | 343/7 VM X |
| 3,018,368 | 1/1962 | Mountjoy | 180/98 X |
| 3,235,025 | 2/1966 | Quinn | 343/7 VM X |
| 3,408,646 | 10/1968 | Simon et al. | 343/6.5 SS |
| 3,798,641 | 3/1974 | Preti | 343/6.5 SS |

*Primary Examiner*—Malcolm F. Hubler
*Attorney, Agent, or Firm*—Flynn & Frishauf

[57] ABSTRACT

Radiation is directed between moving vehicles, and the time between transmission and reception of waves, such as microwaves, is determined similarly to radar timing, to determine the spacing between the vehicles. To prevent spurious responses and ambiguities, the signal reflected from the leading vehicle to the trailing vehicle is modulated; modulation can be controlled either automatically, by providing a modulation control signal associated with a given lane of roadway or under driver-command.

11 Claims, 8 Drawing Figures

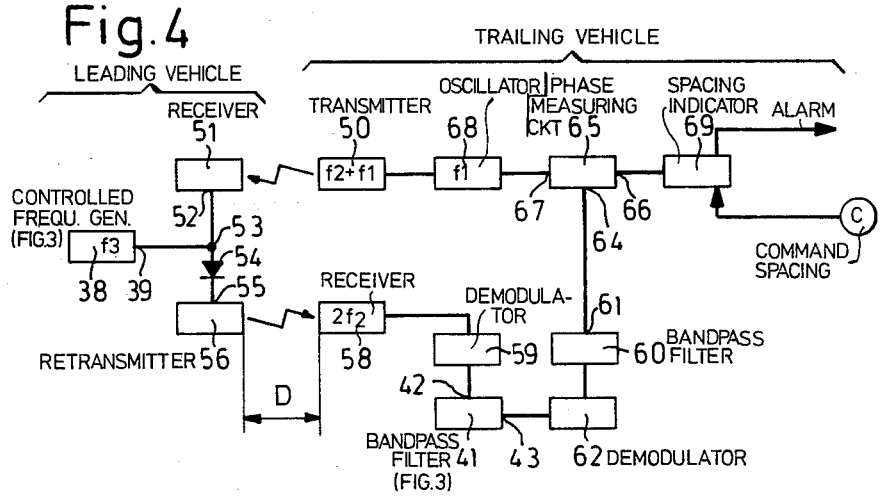
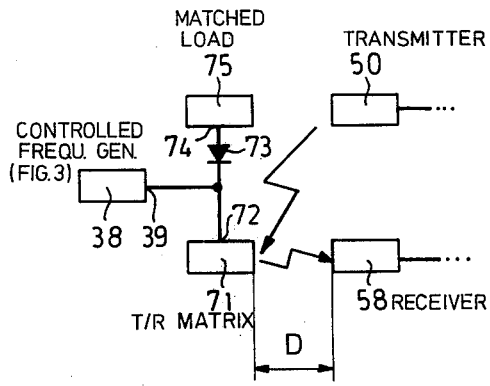
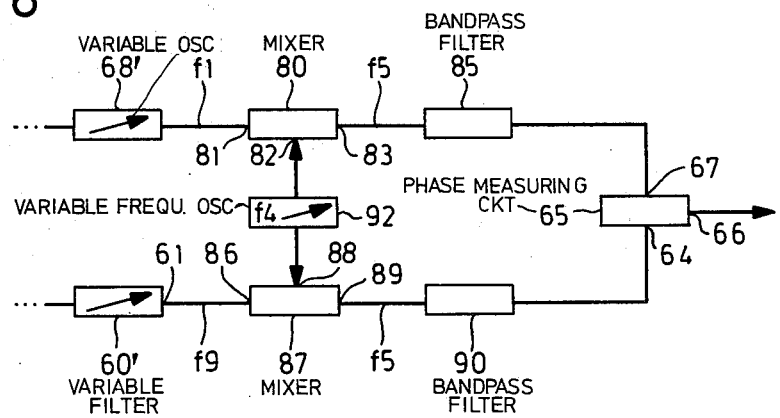

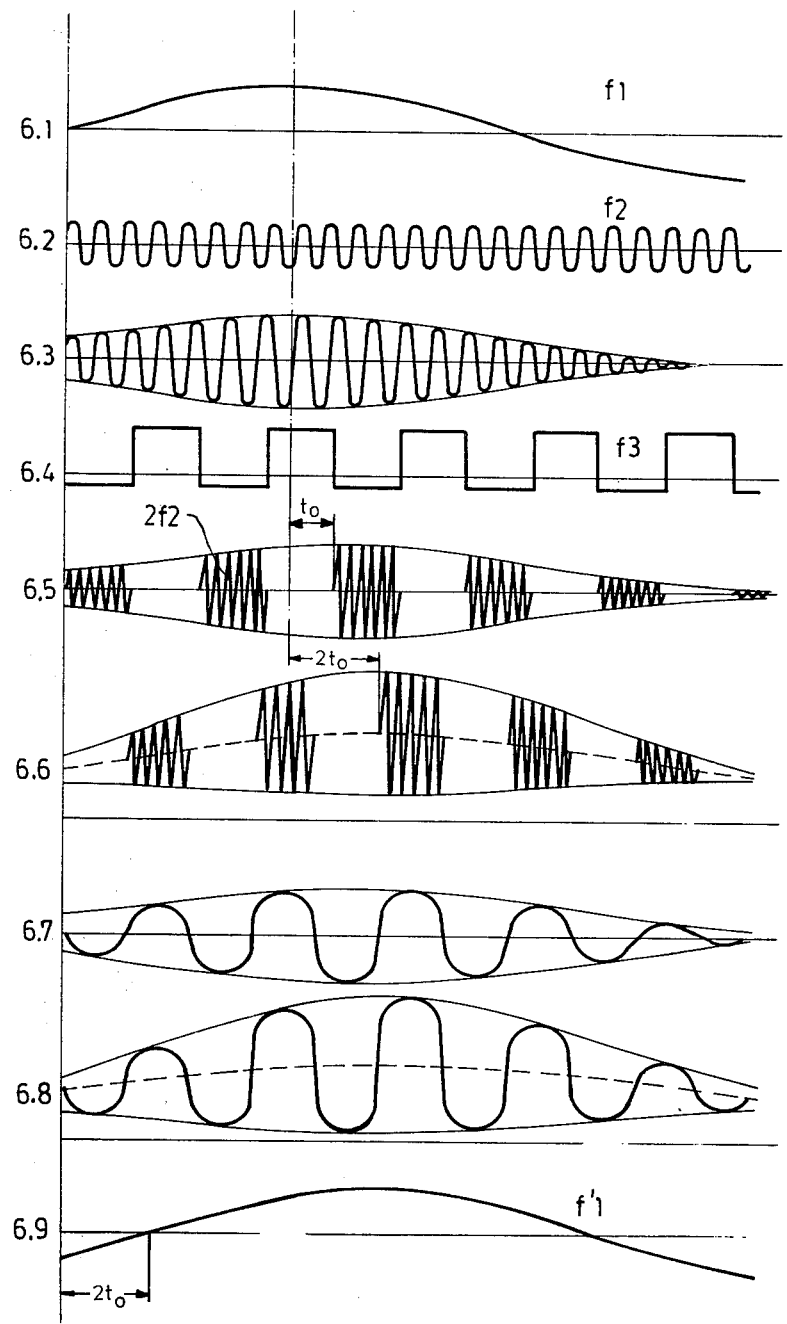

DISTANCE MEASURING SYSTEM, PARTICULARLY FOR SPACING OF MOVING VEHICLES

The present invention relates to a non-contacting distance measuring system, and more particularly to a system to determine the spacing between moving vehicles, to prevent collisions. The basic operating principle of the system is similar to that of radar determination of distance between moving vehicles, in which a radiation beam is propagated between the vehicles, and the time between transmission of the beam, and reception of a reflected signal is evaluated in order to determine the distance therebetween, the transit time per unit length being known.

Various types of collision prevention systems have previously been proposed, in which the distance as well as the differential speed between a leading and a trailing vehicle are measured, using electromagnetic waves in the infrared or microwave region; the waves are then analysed or evaluated by the echo principle, and by analyzing the transit time of the waves from the transmitting vehicle to the object to be measured, and return, similar to radar.

The width of the radiation beam is limited; a small beam, having an angle of dispersion or projection of about 10°, is preferred. A pencil-like beam is not desirable; a somewhat triangular (in plan view) beam is preferred so that vehicles travelling in a curved path are also sensed.

Providing a triangular beam in such a system raises some problems, however:

1. Objects which are of no consequence to the distance measurement, or to the stream of traffic, may also fall within the measuring beam, and hence echoes which are in the nature of noise, or interference, and may lead to false alarms. Typical objects which provide undesired reflections are, for example, road signs and their supports, bridge abutments, bridges and overpasses, fog, raindrops, snow flakes and, quite importantly, vehicles travelling in adjacent traffic lanes in the same traffic direction and pattern, as well as in the opposite traffic direction.

2. Vehicles in the opposite traffic lane radiate electromagnetic radiation forwardly to the transmitter of the radiating vehicle operating the measuring system, which results in faulty operation.

One microwave system which has been proposed requires a particular, special type of reflector located at the rear of the vehicle which returns the echo with double the frequency as that of the sent signal. The receiver is then sensitive only to waves of double frequency, and only such waves are further processed in the receiving system for comparison of timing with the projected signal. This ensures that only echoes which are derived from the rear of a vehicle can be received and processed. Echoes from the front of a vehicle travelling in the opposite direction, echoes from fixed objects such as road signs, raindrops or the like, are rejected by the receiver and thus false alarms and other disturbances are avoided. Such systems are, therefore, already a vast improvement but still have the disadvantage that vehicles in various traffic lanes and in the same traffic direction will send back signals which can be processed by the receiver, if vehicles in various lanes are within the angle of dispersion, or within the main lobe angle of the transmitter.

It is an object of the present invention to provide a distance measuring system, and more particularly a system to measure the spacing between a leading and a trailing vehicle in which an unambiguous, definite output signal for the distance between vehicles in a single traffic lane can be determined.

SUBJECT MATTER OF THE PRESENT INVENTION

Briefly, to remove ambiguity regarding varous vehicles in different lanes, the signal re-radiated, or reflected by the leading vehicle is modulated.

In accordance with a feature of the invention, a frequency generator of variable, preferably selective frequency is provided to modulate the reflected signals; the modulation frequency is determined by the particular lane in which the vehicle travels.

The trailing vehicle, in which the distance or spacing between vehicles is to be measured, has a receiver which is so arranged that it only evaluates signals having the proper modulation frequency associated with the lane in which the vehicle travels. Vehicles travelling in lanes other than those in which the measuring vehicle is located are, therefore, not considered in the signal processing; the distance or spacing measuring system therefore provides reliable, unambiguous output data.

The invention will be described by way of example with reference to the accompanying drawings, wherein:

FIG. 4 is a schematic block diagram of the distance or spacing measuring system;

FIG. 5 is a schematic block diagram of another embodiment of the spacing measuring system;

Figure 7:
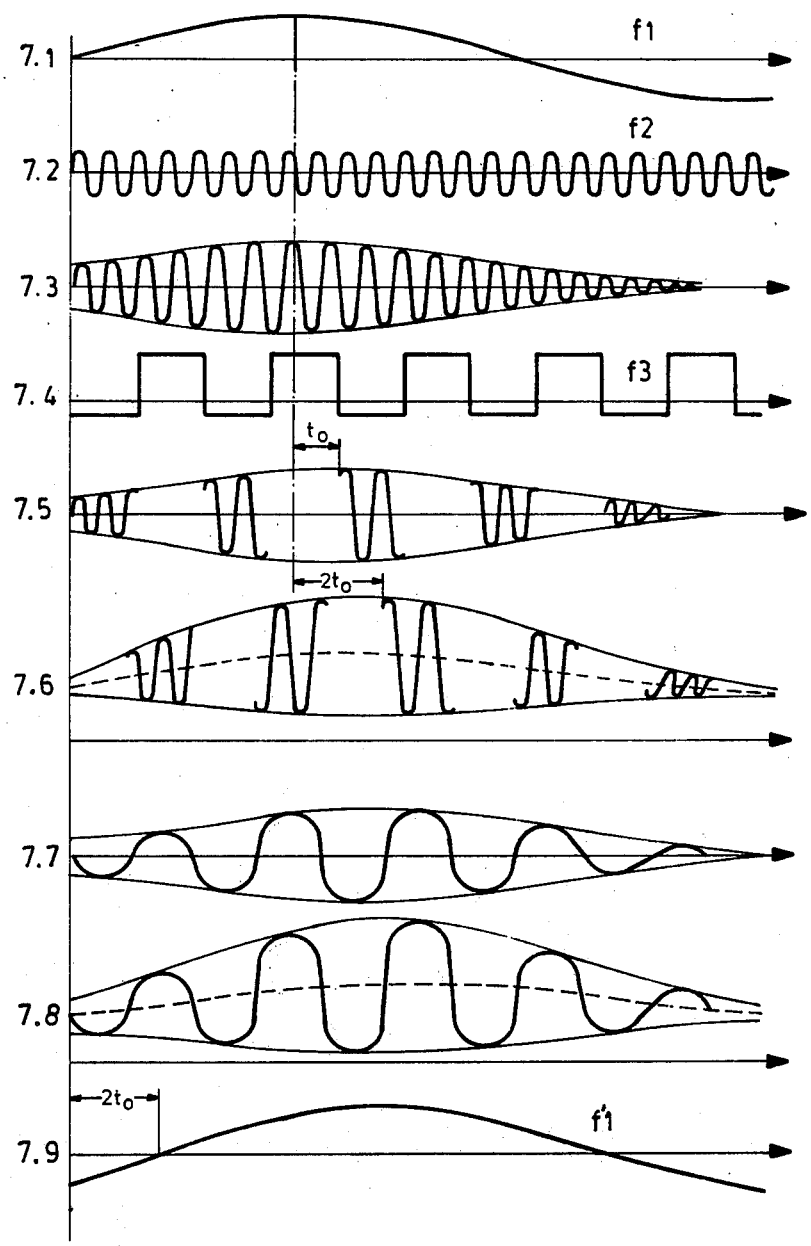

FIG. 6, in lines 6.1 to 6.9, is a diagram of waves and pulses of signals arising in the system of FIG. 4;

FIG. 7, in lines 7.1 to 7.9, is a diagram similar to FIG. 6, but referring to the system of FIG. 5; and FIG. 8 is a block diagram of a receiver when using different transmitter frequencies.

Figure 1:
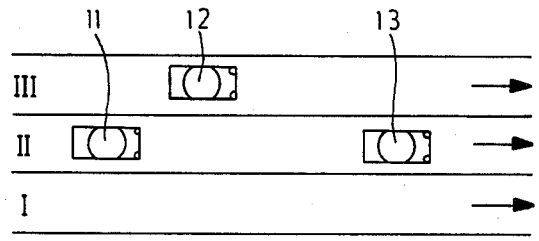
FIG. 1 is a highly schematic top view of a three-lane highway with random vehicle distribution thereon.
Figure 2:
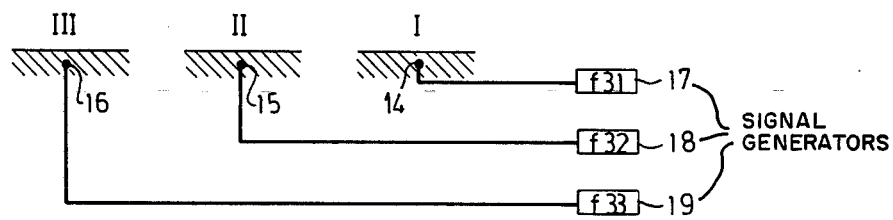
FIG. 2 is fragmentary highly schematic cross-sectional view through the highway of FIG. 1.

Three vehicles 11, 12, 13 are located in lane II and III, respectively, of a three-lane highway, schematically illustrates in FIGS. 1 and 2, to which reference is made. Transducing identification lines 14, 15, 16 are located with respect to the lanes I, II, III, respectively, for example by being embedded centrally of the lanes in the highway. The transducing lines 14, 15, 16 are connected to respective signal generators 17, 18, 19, generating signals of frequencies $f_{31}$, $f_{32}$, $f_{33}$, respectively.

Figure 3:
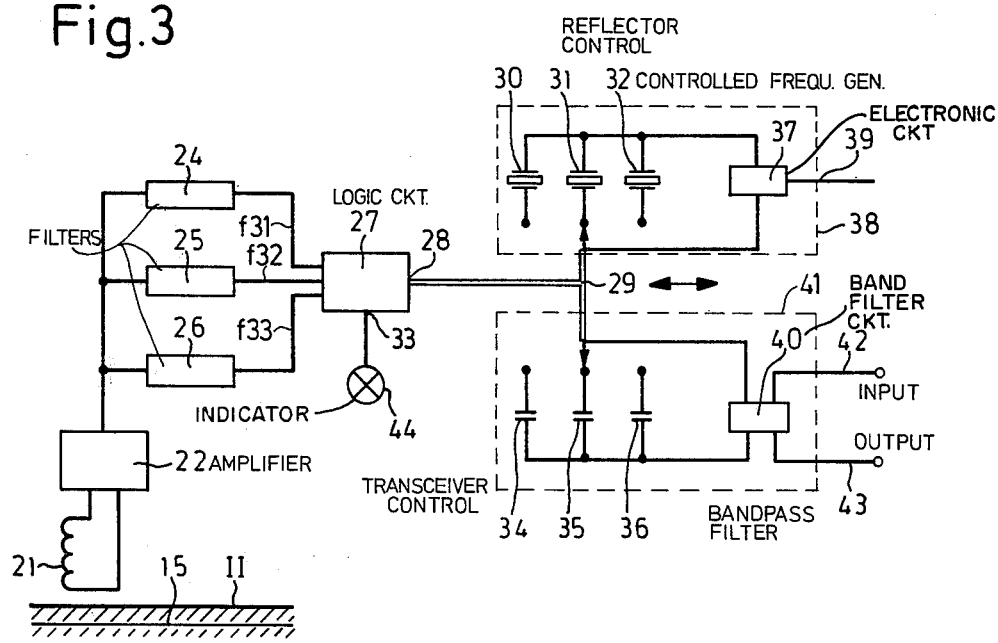
FIG. 3 is a schematic block diagram of a track identification transducing system.

Information regarding the specific lane in which a vehicle travels is obtained by the system of FIG. 3. Lane II, shown in longitudinal section, has embedded therein a signal line 15. An inductance coil 21 located on the vehicle travelling over the highway provides an output signal to a receiver-amplifier 22, which amplifies the signal received from coil 21 and applies it to filters 24, 25, 26. Filters 24–26 are tuned to the track signal frequency $f_{31}$, $f_{32}$, $f_{33}$, respectively, derived from generators 17–19, respectively, and apply their respective output signals to a selection logic circuit 27. The selection logic circuit 27 is connected to band, or range switch 29 which, selectively, connects one of three quartz oscillators 30, 31, 32 to an electronic network 37.

The quartz oscillators 30, 31, 32 control the frequency of the electronic circuit 37. Electronic circuit 37, together with the respective quartz frequency control, form a frequency generator 38, which provides, at its output, a pulse frequency representative of the respective lane. This pulse frequency may be any signal of suitable wave shape, or pulse-type signal, having a characteristic frequency. The electronic controlled frequency generator 38, providing an output signal at line 39, is used to control the frequency of the reflected signal from aft of a leading vehicle. The range switch 29, controlled by logic circuit 28, additionally controls a band filter circuit 40 which has a plurality of capacitors 34, 35, 36 therein, for parallel connection. The entire circuit 40, with the control capacitors 34–36, forms a band-pass filter 41 having an input 42 and an output 43. Band-pass filter 41 may be utilized to control the transmitted signal, as well as to process the received, reflected signal and, in the example of FIG. 1, would be connected to apparatus located forward of the trailing vehicle.

The system to determine the spacing between vehicles is shown in greater detail in FIG. 4. A transmitter 50, having radiating elements forward of the vehicle, radiates signals ahead of the vehicle. It cooperates with a receiving portion 51 aft of another vehicle. The output of the receiver 51 is connected to a junction 53. Junction 53, on the one hand, connects to a diode poled in conductive direction and then to the input 55 of a re-transmitter 56. Junction 53 is further coupled to the output 39 of the controlled frequency generator 38 (FIG. 3).

The re-transmitter 56 re-radiates a signal to a receiver 58 located forward of the trailing vehicle. Receiver 58 is connected over a first demodulator 59 to the input 42 of band-pass filter 41 (FIG. 3). The output of band-pass filter 41 is connected over a second demodulator 62 to a second band-pass filter 60. Output 61 of the second band-pass filter 60 connects to an input 64 of a phase-measuring, or phase-determining circuit 65. Phase-determining circuit 65 compares the phase of the signal at input terminal 64 with a signal at input terminal 67 connected to an oscillator 68. The oscillator 68 modulates the carrier signal transmitted by the transmitter 50. The output signal from the phase measuring, that is, phase comparing circuit 65 is characteristic of the spacing between transmitter or receiver; it is applied from output terminal 66 to a spacing indicator 69, for observation by the operator of the motor vehicle. The distance, or spacing, between vehicles is schematically illustrated at D in FIGS. 4 and 5.

FIG. 5 is a fragmentary schematic representation of a modification of the system. That portion of the system to the right of the transmitter 50 and the receiver 58, and indicated by dotted lines in FIG. 5, is identical to the system of FIG. 4. As before, transmitter 50 and receiver 58 are located at the forward portion of the trailing vehicle. The vehicles are further provided with transmit/receive matrices (T/R) 71, so that the leading vehicle will have such a matrix which may be a dipole, located thereon. The matrix 71 receives the signals from the transmitter 50 of the trailing vehicle and re-radiates the signals back to the receiver 58 on the trailing vehicle. The output 39 of frequency generator 38 is connected to the matrix 71. A rectifier bridge (schematically represented by only a single diode 73 in FIG. 5) is likewise connected to terminal 72 of matrix 71. A matched load 75 is connected to the other terminal of the diode rectifier bridge 73.

Operation, with reference to FIGS. 1, 6 and 7: Let vehicle 11 be referred to as the trailing vehicle, and vehicle 13 as the leading vehicle. Lines 14, 15, and 16 are secured to lanes I, II, III, respectively, and have signals of frequencies $f31$, $f32$, $f33$ applied thereto. Each of the vehicles 11, 12, 13 has a receiver to receive the lane or track information of FIG. 3, and each of the vehicles is supplied at least with one transmitter/receiver combination at the forward portion of the vehicle and a receiver and re-transmitter, or T/R matrix at the aft portion of the vehicle.

Oscillator 68 (FIG. 4) in the trailing vehicle generates a modulation signal $f1$, shown at line 6.1 of FIG. 6. A carrier frequency $f2$ (line 6.2, FIG. 6) is modulated with the modulation signal $f1$ and radiated as a radiated signal from transmitter 50, which will have an envelope as shown in line 6.3 of FIG. 6. The leading vehicle will sense the respective frequency $f3$ (line 6.4, FIG. 6) which will have a pulse repetition rate (PRR), or frequency depending on the lane. The signal illustrated in line 6.3, FIG. 6, received in the receiver 51 (FIG. 4) is applied to the re-transmitter 56 over diode 54. Oscillator 38 alternately biasses the diode 54 in conductive and non-conductive condition in accordance with the PRR of $f3$, line 6.4, FIG. 6. The re-transmitter 56 (FIG. 4) will thus re-transmit back to the trailing vehicle the signal illustrated in line 6.5, FIG. 6. The re-transmitted signal is phase-shifted by the transmission time of the transmitted signal from the transmitter 50 to the receiver 51, and by doubling the frequency of the carrier due to the rectification within the diode 54. The modulation envelope for the re-transmitted signal is also shown in line 6.5, FIG. 6, to clearly illustrate the phase shift. The re-radiated signal from the re-transmitter 56, line 6.5, FIG. 6, is received in the receiver 58 (FIG. 4) which is tuned to the frequency $2f2$. The received signal already is phase-shifted by double the transmission time of the transmitted signals ($2 \cdot t_o$) with respect to the signal transmitted as seen on line 6.3, FIG. 6. The first demodulator 59 and the first band-pass filter 41 are tuned to the PRR and provide, respectively, output signals shown in lines 6.6 and 6.7, FIG. 6. The filtered lane signal frequency now corresponds to the frequency or PRR of the signal illustrated in line 6.4. A second demodulator and a second band-pass filter 60 are tuned to the modulation signal; the output at terminal 61 of the second band-pass filter 60 is shown at line 6.9, FIG. 6.

The phase comparator 65 determines the phase difference between the modulation signal (line 6.1, FIG. 6) of the oscillator 68 and of the received signal, shown in line 6.9. The phase difference depending on the transit time of the transmitted signal (line 6.3) from the transmitter 50 to the receiver and of the signal shown in line 6.5 from the re-transmitter 56 to the receiver 58 is a measure of the spacing between the vehicles. The phase difference between these signals, corresponding to the transit time of the respective signals, corresponds to the distance D (or, rather, to twice that distance) and half of this phase difference will be a direct measure of the spacing of the vehicles, and can be so indicated in spacing indicator 69.

The wave and pulse diagrams of FIG. 7 correspond to those of FIG. 6; the difference arises in lines 7.5, and 7.6. The carrier frequency of the reflected signal, line 7.5, FIG. 7, differs from that of the frequency illustrated in line 6.5, FIG. 6.

The reflected terminating resistance of the dipole matrix 71 is changed with the land or track information, that is, with the PRR representing the respective travelling lane. The dipole matrix is tuned to the frequency of $f2$, that is, the frequency illustrated in line 7.2, FIG. 7. The reflected load resistance 75 is periodically connected and disconnected by means of the diode bridge represented by the diode 73, in synchronism with, and as controlled by the controlled frequency generator 38 (FIG. 3). The unloaded dipole array reflects the signal radiated thereto; the dipole array with the load connected, however, absorbs the signal if the matched loading resistor 75 has the proper matched value. The signal which is re-radiated, or reflected back to the receiver 58 is thus modulated with the PRR representing the respective travelling lane.

Not all highways may be supplied with highway lane controlled lane or track information, or the vehicle may be travelling only on a two-lane highway. If no signals are picked up by the coil-amplifier combination 21, 22 (FIG. 3) then an indicator 44, connected to the logic circuit 27, will show that the logic circuit 27 does not receive any information at its various inputs. The operator of the vehicle then has to, manually, set the proper lane or track information into the controlled frequency generator 38, and the band-pass filter 41, respectively. Switch 29, therefore, additionally has a manual control, to permit range changing by the operator, so that the signal from the transmitter 50 (FIG. 4) of the trailing vehicle is properly pulsed with the frequency corresponding to the traffic lane. Those elements represented by the blocks in FIG. 4 must be capable of being tuned which depend on the frequency of the respective traffic lane — namely the frequency generator 38 and the second band-pass filter 41.

The trailing vehicle can distinguish, by frequency allocation, in which lane a leading vehicle is located. Objects which are not relevant to distance measuring and laterally of the traffic lane of the trailing vehicle are not sensed which, therefore, provides for unambiguous distance and spacing determination. Only those signals are processed in the system of the present invention which are re-radiated or reflected by a leading vehicle in the same traffic lane. Considering, however, the traffic distribution of FIG. 1, it will be seen that with the same carrier frequency $f2$ (FIGS. 6, 7, lines 6.2, 7.2), the leading vehicle 13 will re-radiate or reflect two signals having the same modulation frequency. Accurate, unambiguous measurement of distance between the two vehicles 11, 13 is not assured. If the three lanes I, II, III, however, provide different, separate modulation signals $f1$, then an unambiguous determination becomes possible. Change-over of the frequency then is synchronized with, and controlled by the range switch 29.

Referring to FIG. 8, in which the modification providing for unambiguous distance measurement is illustrated: Oscillator 68', corresponding to oscillator 68 of FIG. 4, is arranged to oscillate with variable frequency. Band-pass filter 60', corresponding to band-pass filter 60 of FIG. 4, likewise can be tuned to different frequencies. A first mixer 80 having two inputs 81, 82 and an output 83, is connected between oscillator 68 and input 67 of the phase-measuring or comparison circuit 65. The output 83 of mixer 80 is connected over a further band-pass filter 85 to the input 67 of the phase comparator 65. Similarly, the output 61 of the second band-pass filter 60' is connected to the input 86 of a second mixer 87; the output 89 of the second mixer 87 is connected over a band-pass filter 90 to the input 64 of the phase comparator 65. A further input 88 of the second mixer 87, as well as the input 82 of the mixer 80, are connected to a variable frequency oscillator 92. The circuit to the left of FIG. 8, illustrated by the dotted lines, is similar to the circuit of FIG. 4 (or FIG. 5, respectively) and having the components starting with component 62 and 50, respectively (referring to FIG. 4).

Operation, circuit of FIG. 8: The modulation signal $f1$ of the oscillator 68', and the frequency $f9$ (FIGS. 6, 7; line 6.9, 7.9) of the variable filter 60' can be mixed with a variable frequency $f4$. The various frequencies are so matched to each other that at the outputs 83 and 89 of mixers 80 and 87 a signal is derived which will have a constant frequency $f5$, being the difference between $f1$ and $f4$. Although the two frequencies at the outputs 83, 89 of the mixers 80 and 87 have the same value, the phase position will differ due to the different transit time. Mixers 80, 87 have band-pass filters 85, 90 connected thereto, which filter those frequencies which are not necessary or pertinent to the phase determination, so that the phase comparator 65 will have applied thereto only a signal having the constant frequency $f5$. A group of reflected signals of a vehicle in the same lane as the trailing vehicle can now be selectively filtered so only the signal having the same pulse frequency as that of interest for the trailing vehicle is being processed. Signals transmitted, for example, by vehicle 12 will impinge on the dipole matrix 71 (FIG. 5), and will be re-transmitted by re-transmitter 56 (FIG. 4) of the vehicle 13, due to spread of the signal from the vehicle 12. These signals are not, however, of interest to vehicle 11. The vehicle 11, FIG. 1, can discriminate between signals generated by vehicle 12 and reflected, or re-radiated by vehicle 13. Thus, distance or spacing measurement becomes unambiguous as between vehicles 11 and 13. Table 1 shows an example of frequency distribution $f1$ of the oscillator 68, as well as a suitable frequency $f4$ of the oscillator 92, in dependence on the traffic lane.

The spacing measurement can be used for any vehicles in any traffic pattern, not only for automotive vehicles on highway lanes; they are particularly useful, also, for example for ships in canals.

Each vehicle requires a transmitter and a receiver at the forward portion and a receiver and re-transmitter at the aft portion, as well as a means to determine the lane, or track information, which may be automatic (FIG. 3) and controlled by the lane itself, or operator-controlled.

The output signal derived from indicator 69 (FIG. 4) and obtained by phase measurement, or phase comparison of the transmitted and received signal, can be compared with a signal which is representative of a minimum safe distance between two vehicles. If the measured distance is smaller than a computed command minimum distance, an optical or acoustic (or both) warning signal can be provided. The minimum spacing may be calculated, for example, by considering the speed of the moving vehicle, its weight, loading, braking efficiency, and the like.

Lane or track information need not be generated by electromagnetic radiation as illustrated in FIG. 2; suitable transducer arrangements responding to different physical parameters may be used, for example colored paint markings on the respective lanes, or other strips or information-providing indicia which can be sensed and transduced can be applied to the traffic lanes.

Various changes and modifications may be made and features described in connection with any one of the embodiments may be used with any other, within the scope of the inventive concept.

Table I

| Lane | f1 | f4 |
| --- | --- | --- |
| I | 496 KHz | 506 KHz |
| II | 498 KHz | 508 KHz |
| III | 500 KHz | 510 KHz. |

We claim:

1. Non-contacting distance measurement apparatus to determine the distance between leading and trailing vehicles moving in a predetermined traffic lane of a multiple traffic lane highway between two sequentially positioned vehicles having means (50) secured to the trailing vehicle to propagate radiation towards the leading vehicle;

means (58) to receive returned radiation;

means (65) to determine the transit time of the radiation between the vehicles to determine their distance based on known propagation speed of the radiation, comprising a frequency generator (38) to modulate the signal reflected from the leading vehicle to the trailing vehicle;

traffic lane signalling means (14, 15, 16) respectively associated with a respective traffic lane (I, II, III) and providing respective, different lane identification outputs;

and means (21, 22; 24-27) responsive to said lane identification output defined by the respective traffic lanes, and coupled to the frequency generator (38) to determine a respective modulation frequency.

2. System according to claim 1, wherein the traffic lane signalling means (14, 15, 16) comprises electrical signal means located in the respective traffic lanes.

3. Apparatus according to claim 1, wherein the frequency generator (38) provides a periodic, cyclical signal (6.4; f3).

4. System according to claim 1, in which the vehicle comprises means located on the aft portion of the vehicle including a diode circuit (54; 73), the frequency generator (38) being responsive to the respective lane frequency and controlling the frequency of the re-radiated signal.

5. System according to claim 4, wherein the aft portion of the vehicle is provided with a receiver (51) to receive signals radiated from a trailing vehicle, the receiver being connected to said diode circuit (FIG. 4).

6. System according to claim 1, wherein means (50) are provided on the trailing vehicle to generate a carrier signal; and means (68) to generate a modulating signal to modulate said carrier signal; and the frequency generator (38) additionally modulates said modulated carrier signal upon re-radiation of the signal to the trailing vehicle.

7. Apparatus according to claim 6, wherein the receiving means (58) are secured to the trailing vehicle and receiving the signal reflected, or re-transmitted from the leading vehicle and includes a series circuit comprising serially connected first demodulator means (59) and a first band-pass filter (41) as well as second demodulator means (62) and a second band-pass filter (60), the first band-pass filter (41) being tuned to the frequency corresponding to a predetermined traffic lane, and a second band-pass filter (60) being tuned to the frequency of modulation (f1) of the carrier signal.

8. Apparatus according to claim 7, wherein the means responsive to the lane identification output comprises receiving means (21, 22) on the vehicles, and in receiving relationship to said means defined by the traffic lanes to determine a respective lane frequency; filters (24, 25, 26) corresponding to said lane frequency; a selection logic (27) connected to said filters and providing output signals representative of which ones of the signals representative of a respective lane are sensed;

and band switch means (29) controlled by the output of said logic circuit (27) and determining the frequency of the frequency generator (38) and of said first band-pass filter (41).

9. Apparatus according to claim 8, wherein the modulation signal (f1) for a carrier oscillator (68) for the carrier frequency is dependent on the respective sensed lane (I, II, III);

the second band-pass filter (60) being connectable to the modulation signal (f1) corresponding to the respective lane by means of the band switch means (29).

10. Apparatus according to claim 9, further comprising a local oscillator (92) providing an output frequency (f4), the frequency of which is dependent on the respective traffic lane (I, II, III) as switched by said band switch means (29);

a phase comparator (65) is provided having applied thereto the signal from the oscillator (68') and from the second band-pass filter (60'), the signals derived from said oscillator (68') and the band-pass filter (60') being mixed with the signal (f4) from the local oscillator (92) before being applied to said phase comparator.

11. Apparatus according to claim 10 further comprising indicator means (69) connected to said phase comparator and providing an output representative of spacing between the leading and the trailing vehicle;

and command spacing means (C) connected to said output and effecting a comparison between a commanded spacing and actual spacing if the actual determined spacing is less than the commanded spacing.

* * * * *